Dec. 30, 1958     A. W. BAUER     2,866,525
DISC BRAKE
Filed Oct. 11, 1954
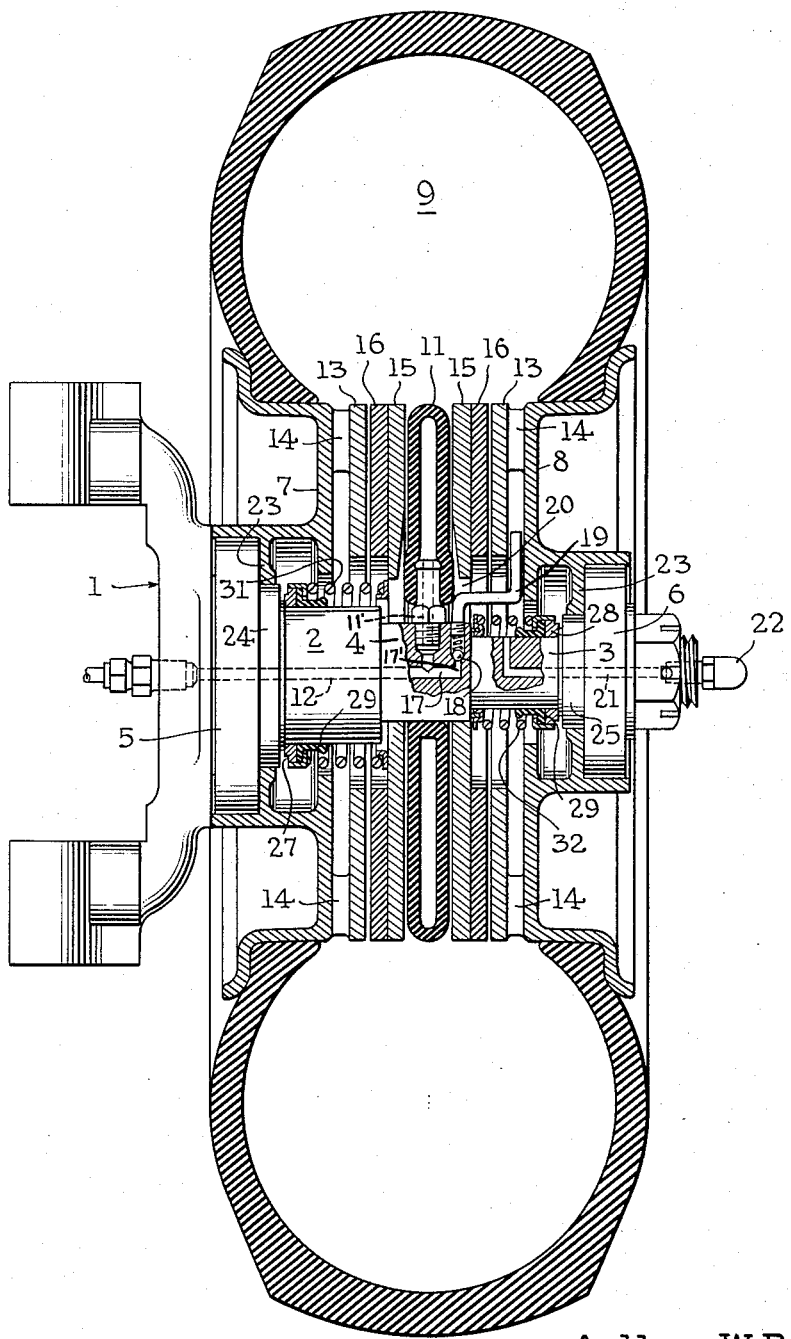
INVENTOR
Arthur W. Bauer
BY Dodge and Sons
ATTORNEYS

United States Patent Office 2,866,525
Patented Dec. 30, 1958

2,866,525

DISC BRAKE

Arthur W. Bauer, Omaha, Nebr.

Application October 11, 1954, Serial No. 461,384

1 Claim. (Cl. 188—72)

This invention relates to disc brakes. Specifically it relates to a disc brake structure which is intended for use with a wheel disc on which may be mounted a pneumatic tire of the tubeless type.

The assembly comprises a stationary spindle of more or less conventional form. Two wheel discs are journalled on the spindle and receive a tubeless tire on their outer peripheries. Between the journals on the spindle there is a polygonal portion which carries a pressure motor secured thereto. Between the motor and each wheel disc there is a brake disc arranged to react against the wheel discs when the pressure motor is actuated.

Compressed gas, usually air, is admitted to the motor through a bore formed in the spindle. A second passage extends from the motor space to the interior of the tire. A check valve inhibits reverse flow from the tire to the motor space.

This second passage is small relative to the motor inlet passage, so that development of adequate brake pressure is not impeded. The air which flows through this second passage serves two purposes: (1) it cools the brake discs and the air in the tire, and (2) it maintains a proper pressure in the tire. A relief valve is provided to prevent development of excessive pressure in the tire.

An important feature of the invention is the use of a tubeless tire, because it is possible to make the brake discs of a larger diameter than would be possible if an inner tube were used. The brake discs may be extended beyond the outer peripheries of the wheel discs if this is desired, but it is believed that adequate braking surface is afforded by making them of a diameter slightly less than that of the wheel discs. Even this diameter affords a materially larger braking surface than would be available in a wheel disc in which the mounting flanges are connected by a web as they must be if an inner tube is used.

A preferred embodiment of the invention will be described having reference to the single figure of the accompanying drawing which is in axial section.

Reference numeral 1 indicates generally a more or less conventional front wheel spindle assembly. This assembly includes a spindle proper which has two journals 2 and 3 of different diameters. The journals 2 and 3 are spaced by an intermediate portion 4 which is illustrated as having a square cross section. Pressed onto the journals 2 and 3 respectively are the inner races of bearings 5 and 6.

The outer races of bearings 5 and 6 carry the hubs of wheel discs 7 and 8. A tubeless tire 9 is mounted on the peripheral flanges of the discs 7 and 8.

Mounted on the square portion 4 is an expansible chamber motor 11. A bore 12 is formed in the spindle and affords an inlet to the motor 11. The fitting 11' connecting bore 12 with the interior of motor 11 is in constant communication therewith and may be considered as part of the motor's working space.

A hardened braking surface 13 is provided on each of the wheel discs and is spaced therefrom by spacers 14. Between each of the surfaces 13 and the motor 11 there is a brake disc 15 which carries thereon a friction facing 16. The central openings in discs 15 are substantially square and fit the portion 4 so that they are held against rotation, but may slide axially on the spindle. Other forms of splined connections could be used. A short pipe 19 is threaded into the end of passage 17. A notch 20 is provided in the right hand plate 15 to accommodate this pipe.

Port 17 extends from bore 12 to the surface of the spindle. A check valve 18 inhibits flow through port 17 toward bore 12 but permits reverse flow. Pipe 19 directs the air passing therethrough radially outward from the spindle so that it passes between disc 8 and the hardened braking surface 13. Port 17 includes a reduced diameter portion 17' as shown beneath check valve 18.

A port 21 extends from the spindle surface to the outer end of the spindle. A relief valve 22 controls flow through this port and opens to vent excess pressure.

The wheel disc hubs are provided with radial flanges 23 into which are pressed collars 24 and 25 which are provided with polished inner surfaces. Sealing members 27 and 28 respectively are biased by springs 31 and 32 against the polished surface of collars 24 and 25. Rubberlike sleeves 29 provide a seal to prevent leakage along the spindle and beneath members 27 and 28. These rotary seals prevent the escape of air from the tire to atmosphere. The springs 31 and 32 also bias the brake discs 15 toward their brake releasing position.

In operation the motor 11 is normally inert, the passage 12 being vented by means of a valve, not shown. When the motor 11 is inert the brakes are released since springs 31 and 32 bias the brake discs 15 away from the facings 13. When the valve is operated to admit compressed air to the passage 12 and motor 11, the motor is energized and overcomes the bias of springs 31 and 32 thus applying the brakes. Some of the air from passage 12 and motor 11 flows through port 17 past the check valve 18 and through pipe 19 into the interior of the tire and brake assembly. The pipe 19 is located so that this air entering the tire therefrom flows over the rear face of braking surface 13 and provides cooling for this surface. The flow of air from pipe 19 is however limited to a maximum value such that the development of pressure in motor 11 is not impeded. This air flowing through pipe 19 also maintains tire pressure at the desired value which is determined by the setting of relief valve 22.

Although a preferred embodiment of the invention has been described in detail, the invention is not limited to this precise embodiment, and no limitation thereto is implied except as may be expressed in the appended claim.

What is claimed is:

A disc brake assembly comprising in combination a spindle; a pair of spaced wheel discs journalled thereon and receiving at their outer peripheries a tubeless tire, each of said discs having a radial braking surface on its inner face, said spindle having a splined portion intermediate the wheel discs; a pressure motor, carried by the splined portion and including abutments movable axially of the spindle; a pair of brake discs, one on each side of the motor, splined to said spindle; springs biasing said brake discs toward the motor; inlet means through said spindle to the working space of the motor; passage means having a smaller flow capacity than said inlet means affording a flow communication between the working space and the interior of the tire; check valve means inhibiting reverse flow through the smaller flow passage; and a relief valve in flow communication with the interior of the tire to relieve excessive pressure in the tire.

No references cited.